United States Patent [19]

Mayes

[11] Patent Number: 4,630,939
[45] Date of Patent: Dec. 23, 1986

[54] TEMPERATURE MEASURING APPARATUS
[75] Inventor: M. D. Mayes, Baton Rouge, La.
[73] Assignee: The Dow Chemical Company, Midland, Mich.
[21] Appl. No.: 798,500
[22] Filed: Nov. 15, 1985
[51] Int. Cl.⁴ .......................................... G01N 25/00
[52] U.S. Cl. .................................. 374/135; 374/138; 376/247
[58] Field of Search .................. 374/135, 138, 148, 5; 376/247; 73/432 B

[56] References Cited

U.S. PATENT DOCUMENTS

| | | | |
|---|---|---|---|
| 3,007,340 | 7/1961 | Kraftson | 73/432 B |
| 3,130,584 | 4/1964 | Kennedy | 374/135 X |
| 3,596,518 | 8/1971 | Kirkpatrick | 374/135 X |
| 3,742,763 | 7/1973 | Sczerba | 73/343 R |
| 3,938,544 | 2/1976 | Bernaerts | 374/4 X |
| 3,946,610 | 3/1976 | Sartorius | 136/230 X |
| 4,044,612 | 8/1977 | Powell | 374/135 |
| 4,134,738 | 1/1979 | Bress et al. | 48/85.2 |
| 4,290,306 | 9/1981 | Murakami et al. | 73/354 |
| 4,396,401 | 8/1983 | Davis | 48/85.2 |
| 4,403,516 | 9/1983 | Mailliet et al. | 374/135 X |
| 4,548,517 | 10/1985 | Kampmann | 374/7 X |

Primary Examiner—Daniel M. Yasich
Attorney, Agent, or Firm—A. J. Young

[57] ABSTRACT

This invention relates to an apparatus and process for measuring the temperature of a fluid environment within a vessel. The apparatus features a chamber which opens into the vessel and thus contains a portion of the fluid environment. Structure is provided for preventing substantial convective movement between the portion of the fluid environment within the chamber and the remainder of the fluid environment. A temperature sensing device is also provided which is movable from a position within the chamber to a position into the remainder of the fluid environment for obtaining a temperature measurement. The chamber is maintained at a temperature cooler than that of the fluid environment. This invention also relates to a process for the periodic measuring of the temperature of a fluid environment in a vessel. The process features locating at least a portion of a temperature sensing device in a chamber which opens into the fluid environment and which chamber is kept at a lower temperature than the fluid environment by maintaining that portion of the fluid environment within the chamber and the remainder of the fluid environment in the vessel whereby they are substantially free of convective movement with respect to one another.

13 Claims, 4 Drawing Figures

TEMPERATURE MEASURING APPARATUS

BACKGROUND OF THE INVENTION

This invention relates to an apparatus and process for measuring the temperature of a fluid environment contained in a vessel.

Radiation pyrometer-target tube combinations and tube protected thermocouples are oftentimes utilized as temperature sensing devices to obtain temperature measurement in reaction vessels. The thermocouple, its protecting tube and the target tube have to be comprised of materials which give them an acceptable life under the reaction conditions to which they are exposed. If the reaction temperatures are very high, such as the 3000° F. (1649° C.) temperatures found in the partial oxidation of carbonaceous slurries, the aforementioned parts of the temperature sensing devices, despite their materials of construction, can expect to have a limited life, say 200 to 300 hours under reaction conditions. It is, however, possible to extend the service life of such parts, i.e., the number of process hours over which such parts are still usable, by taking the temperature measurements periodically and completely removing the parts from the vessel and its fluid environment when temperature measurements are not being taken. Such removal is time consuming and since temperature measurements may be required often, e.g., every half hour, it can be appreciated that removal of the parts sought to be protected is manpower intensive and thus, not very cost effective.

It is therefore an object of this invention to provide an apparatus and a process for the taking of periodic temperature measurements of a vessel's fluid environment, which apparatus and process have decreased manpowe requirements for operation. It is another object of this invention to provide an apparatus and process which provides for the replacement of a temperature measuring device, which device is used for monitoring the temperature of a process occurring in a vessel, without necessitating process shutdown.

The Invention

The apparatus of this invention, to achieve the foregoing objects, features a chamber which opens into the interior of the vessel and which thus contains a portion of the vessel's fluid environment. (For the sake of convenience, the portion of the fluid environment within the chamber will be referred to as the chamber fluid environment while the remainder of the fluid environment in the vessel will be referred to as the vessel fluid environment.) The chamber can be of any suitable configuration and is sized to accommodate a movable temperature sensing device, hereinafter described, so that the chamber does not contact the temperature sensing device as it moves with respect to the chamber. Initially, the chamber fluid environment will need to be cooled to a temperature which does not adversely affect the service life of the temperature sensing device. This cooling is achieved by the use of a cooling mechanism associated with the chamber. Due to the fact that the chamber fluid environment will be at a temperature cooler than that of the vessel fluid environment, orientation of the chamber must be made so that there is no natural convection between the two environments as a result of a difference in their densities. Thus, the chamber should be oriented so that the chamber fluid environment does not pour out of the chamber by force of gravity. It has been found convenient and preferential that the chamber have a cylindrical shape for at least that portion most proximate the vessel fluid environment.

The chamber has associated therewith structure for preventing substantial convective movement between the cooled chamber fluid environment and the vessel fluid environment. By minimizing and in some cases, totally preventing such convective movement, there will be little heat transfer between these two fluid environments. However, there can be some heat transfer from the vessel interior to the chamber fluid environment due to radiation and/or conduction. Should this heat transfer be of concern, the cooling mechanism can be continuously used to maintain the temperature of the chamber fluid environment at the desired level. A preferred cooling mechanism is a jacket about at least a portion of the chamber which jacket carriers a circulating heat transfer medium such as brine, water or steam.

The temperature sensing device of the apparatus of this invention is movable between a first position and a second position. The first position locates at least a portion of the temperature sensing device within the chamber and keeps the entirety of the temperature sensing device out of contact with the vessel fluid environment. The first position is used between temperature measurements and provides, as before discussed, a cool location for the temperature sensing device. The second position locates at least a portion of the temperature sensing device exteriorly of the chamber and in contact with th vessel fluid environment and is used to obtain the temperature measurement of such environment.

The temperature sensing device is preferably a protector tube-thermocouple combination or a radiation pyrometer-target tube combination. The tube protected thermocouple can be of conventional design, which design includes an elongated tube having at and within its probe end one of the thermocouple junctions. This junction and its associated electrical leads are conventionally held within the tube interior by powdered ceramic material. Th other thermocouple junction is located at the other end of the elongated tube and is connected to the first described thermocouple junction by electrical leads. The location is usually exterior of the tube.

The radiation pyrometer-target tube combination includes a hollow elongated target tube and a radiation pyrometer which views, through the interior of the tube, the probe end of the tube. The radiation pyrometer does not contact either fluid environment at any time.

In both of the above cases, the probe ends of the elongated tubes will be that portion of the temperature sensing devices which will make contact with the vessel fluid environment when the temperature sensing devices are in the second position.

Movement of the temperature sensing device between the first and second positions is preferably powered. Double-acting pneumatic cylinders have been found especially suitable because the piston rod of the cylinder can be easily attached to the distal end of the elongated tube portion of the preferred temperature sensing devices, just described, whereby the elongated tube follows the axial to and fro movement of the piston rod. Even more preferred is a double-acting pneumatic cylinder which has a hollow piston rod, as the elongated tube can be partially located within the interior of the hollow rod. Such attachment between the hollow piston rod and the elongated tube will be at their respective distal ends. By having the tube carried in such a manner, easy replacement of the elongated tube can be made in the manner hereinafter described.

This invention also relates to a process for the periodic measuring of the temperature of a fluid environment in a vessel. The process includes locating at least a portion of a temperature sensing device in a chamber which opens into the fluid environment. The chamber, by being open to the fluid environment, will contain a portion thereof. That portion of the fluid environment within the chamber and the remainder of the fluid environment are maintained substantially free of convective movement with respect to one another. This freedom from substantial convective movement is an especially important feature of the process of this invention a heat transfer between the portion of and the remainder of the fluid environment is minimized, if not prevented. The fluid environment within the chamber is initially brought to and maintained at a desired temperature which is cooler than the temperature of the remainder of the fluid environment. For example, the apparatus of this invention can be used to maintain a chamber temperature within the range of from about 70° F. (21° C.) to about 200° F. (93° C.) when used in vessels containing fluid environments having temperatures up to 3000° F. (1649° C.). Should radiation and conductive heat transfer to the chamber from the vessel interior raise the chamber temperature to unacceptable levels, then the chamber can be cooled by the use of a water jacket, etc., about the chamber. The temperature measurements are taken by moving a portion of the temperature sensing device from the cool chamber to a point within the remainder of the fluid environment. After the temperature measurement is taken, the portion of the temperature sensing device moved from the cool chamber is returned thereto until the next temperature measurement is needed.

This and other features contributing to satisfaction in use and economy in manufacture will be more fully understood from the following description of a preferred embodiment of the invention when taken in connection with the accompanying drawings in which identical numerals refer to identical parts and in which.

Figure 1:
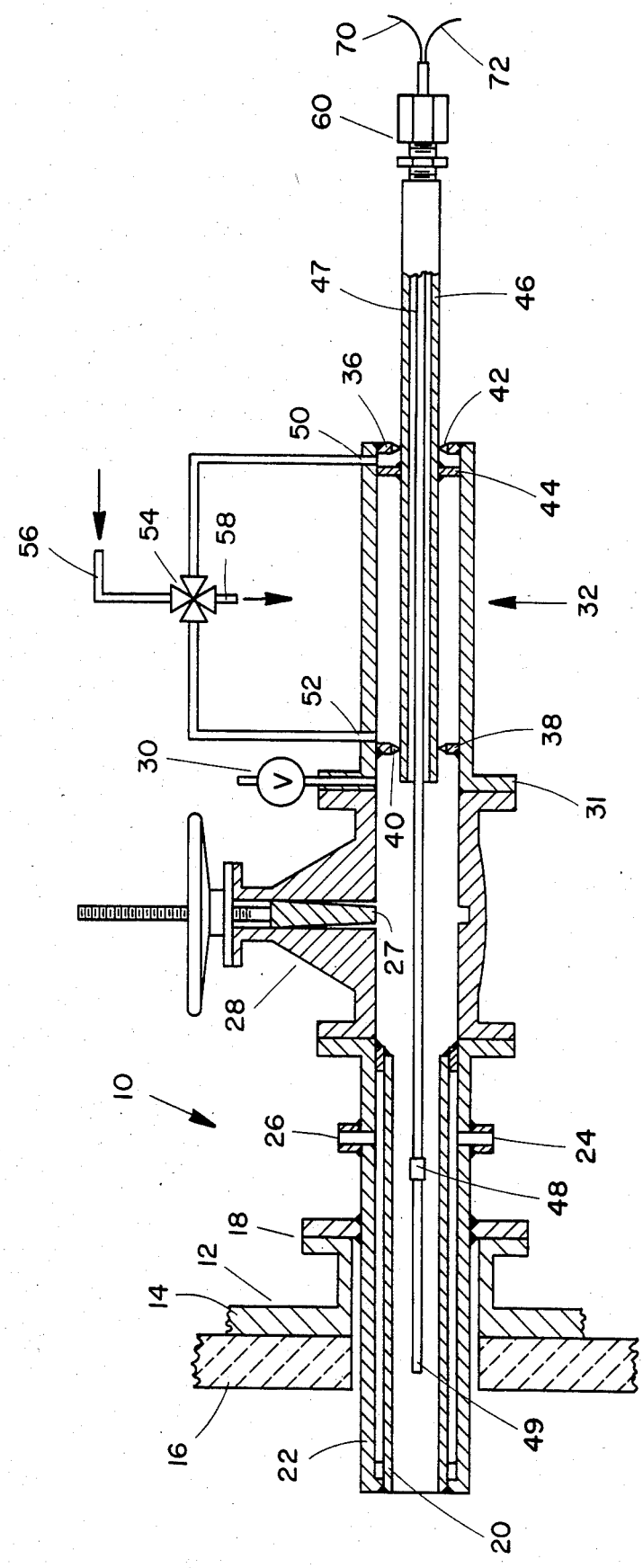
FIG. 1 is a sectional view of an apparatus of this invention with the temperature sensing device in the first position.

Referring now to FIGS. 1–4, there can be seen an apparatus of this invention, generally designated by the numeral 10, mounted to a vessel wall, generally designated by the numeral 12. Vessel wall 12 comprises an outer metallic shell 14 and an inner refractory lining 16. This type of vessel wall is used for vessels in which high temperature/high pressure reactions are to occur, e.g., the partial oxidation of carbonaceous slurries to produce synthesis gas and the like. It is to be understood that apparatus 10 is useful with other types of vessels. Mounting of apparatus 10 to vessel wall 12 is achieved in a fluid-tight manner by way of flange fitting 18.

Figure 2:
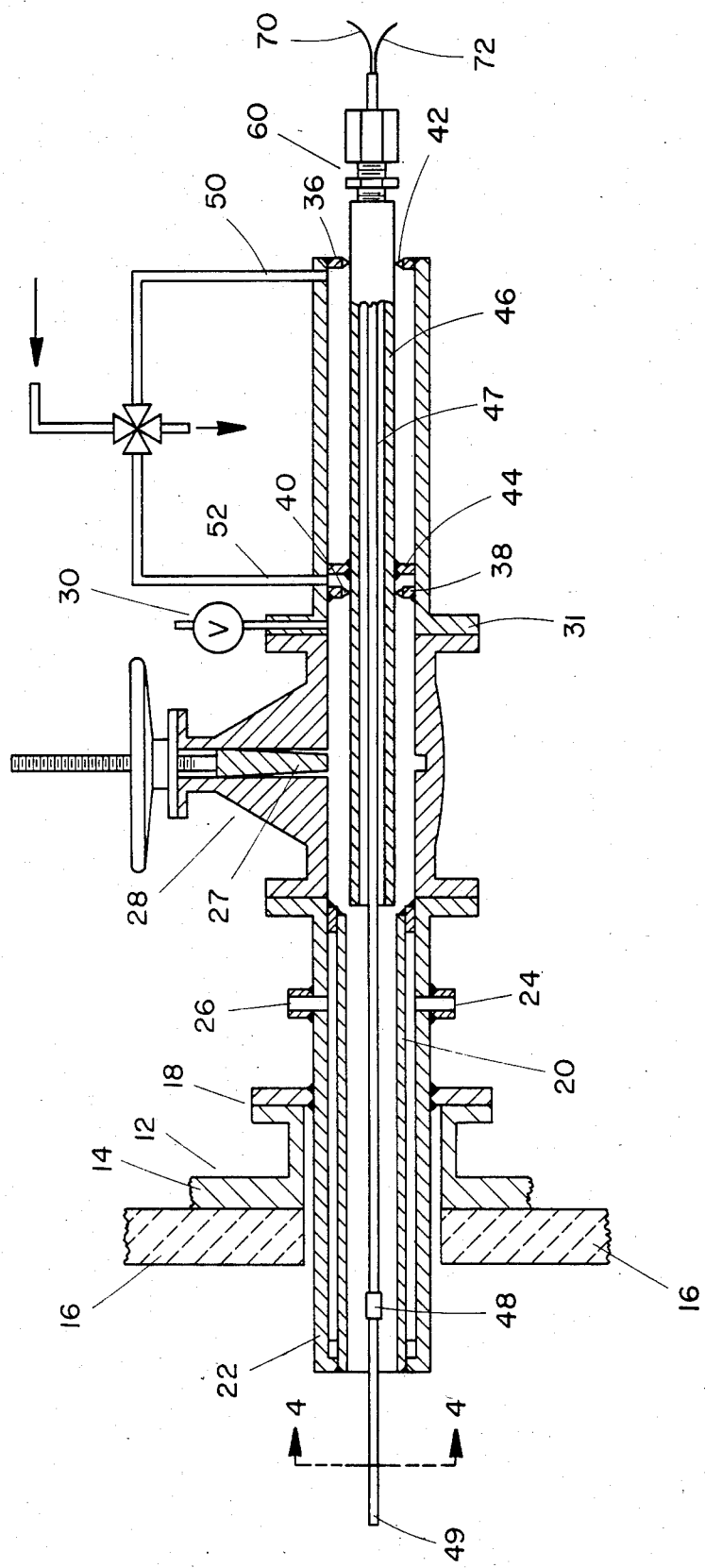
FIG. 2 is a sectional view of the apparatus shown in FIG. 1 with the temperature sensing device in the second position.

Apparatus 10 has, at its proximate end, hollow cylinder 20. As can be seen in FIGS. 1 and 2, cylinder 20 extends through vessel wall 12 into the interior of the vessel. The extension of cylinder 20 into the interior of the vessel is not a requirement of this invention but is preferred since such an extension reduces the amount of radiant heat reaching into the space defined by cylinder 20 and since such extension provides protection for temperature sensing device 47 against damaging contact with solid particles or spray which may be moving about the interior of the vessel. To provide cooling of the interior space provided by cylinder 20, there is provided water jacket 22 which fits about the outer surface of cylinder 20. Water jacket 22 is provided with an inlet 26 and an outlet 24 so that a cooling medium ca be circulated throughout the jacket. Water jacket 22 is provided for initially cooling the fluid environment within cylinder 20 and for offsetting the heat transfer to the interior of cylinder 20 which is a result of radiation or conduction from the interior of the vessel.

Cylinder 20 and water jacket 22, at their distal ends, are flange-mounted to gate valve 28. The flanged fitting is fluid-tight. Gate valve 28 is of conventional construction.

In flanged attachment to the distal side of gate valve 28 is a double-acting pneumatic cylinder, generally designated by the numeral 32. This latter flange fit is a fluid-tight fit. At the proximate end of double-acting pneumatic cylinder 32 is relief valve 30 which is seated within a portion of the cylinder flange 31. Double-acting pneumatic cylinder 32 has a proximate end plate 38 and a distal end plate 36 which, along with cylinder 34, defines a hollow cylindrical space into which is slidably carried piston 44. Piston 44 is attached to a hollow piston rod 46 which has sufficient length so that irrespective of the position of cylinder 44, piston rod 46 is in sealing contact with annular proximate rod seal 40 and annular distal rod seal 42. The seal provided by these two seals is a fluid-tight seal. The space between proximate end plate 38 and distal end plate 36 is in gaseous communication with ports 52 and 50. These ports are in turn connected to a conventional, commercially available four-way valve 54 (valve 54 is shown in schematic form). Tube 56 provides a conduit to valve 54 from a source for a pressurized gas such as nitrogen. Tube 58 provides a vent for valve 54 and hence pneumatic cylinder 32.

Mounted within hollow piston rod 46 is tube 47. This mounting is accomplished at the distal ends of both tube 47 and hollow piston rod 46 by way of a removable fluid-tight fitting 60. Such fittings are commercially available, for example, Conax Corporation of Buffalo, New York, produces several fitting assemblies which may be utilized for the purposes of this invention.

Figure 4:
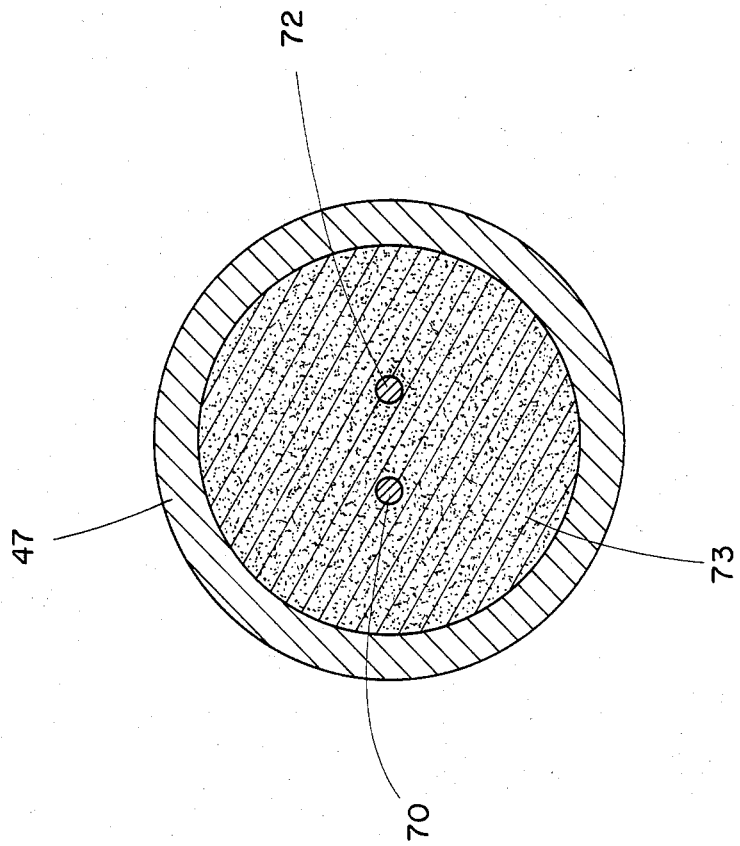
FIG. 4 is a sectional view taken along section lines 4—4 in FIG. 1.

Tube 47 provides protection for a thermocouple, not shown, which is located at and within the probe end 49 of tube 47. Maintaining the thermocouple and electrical conducting wires 70 and 72 in their respective positions within tube 47 is achieved by the utilization of ceramic materials 73 which are shown in FIG. 4. The utilization of protective tubes, such as tube 47, for carrying within their interior a thermocouple is conventional and well known in the art. The materials of construction for tube 47 and the selection of the thermocouple materials is dependent upon the conditions which are encountered within the vessel. It is a feature of this invention that the entirety of tube 47 need not be made of expensive alloys as only probe end 49 of tube 47 will be subjected to the full vessel conditions. Therefore, tube 47, up to union 48, can be comprised of relatively inexpensive materials, such as stainless steel. Union 48 couples probe end 49 to the remainder of tube 47. Probe end 49, since it will be exposed to the vessel conditions, will have to be of a suitable alloy to withstand such conditions. Probe end 49 can be a metal tube or a ceramic tube as conditions require. Exemplary of tube materials which can withstand temperatures of around 2000° F. (1093° C.) are nichrome and nickel. Ceramic tubes can withstand temperatures of about 3000° F. (1649° C.) and can be made of silica or silicon carbide. The materials of construction for the thermocouple are dependent upon the temperatures which are to be encountered. For example: 90% Platinum-10% Rhenium vs. Platinum; and Chromel-P vs. Alumel are useful at temperatures of 3100° F. (1704° C.) and 2200° F. (1204° C.), respectively. When apparatus 10 is utilized for measuring temperature in a partial oxidation of carbonaceous slurry process, it has been found that probe end 49 is preferably made of 53% molybdenum-47% rhenium alloy and that the thermocouple housed therewithin is a 95% Tungsten-5% Rhenium vs 74% Tungsten-26% Rhenium thermocouple.

The attachment of apparatus 10 to vessel wall 12 results in a portio of the vessel fluid environment to enter apparatus 10. In operation, apparatus 10 will normally have tube 47 in the first position as shown in FIG. 1. The fluid environment within apparatus 10 is contained within a chamber defined by cylinder 20, gate valve 28 and the annular space defined by the inside wall of hollow piston rod 46 and the outside wall of tube 47. (This so contained fluid environment is referred to as the chamber fluid environment to differentiate it from the vessel fluid environment.) Convective movement between the chamber fluid environment and the vessel fluid environment is thwarted as the chamber is sealed (note the seals provided by the flange fittings, proximate seal 40 and by fitting 60) and thus no convective heat transfer between the chamber fluid environment and the vessel fluid environment will occur. In the first position, therefore, tube 47, its probe end 49 and the contained thermocouple are not subject to the temperature conditions inside of the vessel. When a temperature measurement is desired, valve 54 is actuated to cause pressurized gas to enter tube 50 and to cause tube 52 to be communicated with vent tube 58. Piston 44 moves in response to the resulting change in pressure in cylinder 34 thereby locating probe end 49 outside of the just defined chamber and into the interior of the vessel as is shown in FIG. 2. No substantial convective movement is experienced by the chamber fluid environment as the chamber is still sealed. After the thermocouple has provided the necessary output to obtain the desired temperature measurement, valve 54 is actuated to provide gas in tube 52 and to connect tube 50 to vent tube 58. Piston 44 returns to the position shown in FIG. 1 and probe end 49 is returned to the chamber and within the cool zone provided by cylinder 20.

Maintenance of the chamber seals can be easily monitored by the thermocouple as it resides in the cooled chamber. A chamber seal leak will allow convective movement of a portion of the fluid vessel environment into the chamber and a consequent rise in chamber temperature will occur. The thermocouple will sense this temperature rise and provide a temperature measurement for alerting operating personnel to re-establish chamber seal integrity.

Even though the apparatus of this invention prolongs the service life of the temperature sensing device, the periodic temperature measurements will eventually consume the expected life of the temperature sensing device. Once the temperature sensing device is no longer operable, it has to be replaced. For the embodiment shown in the Figures, replacement of the temperature sensing device can be performed easily and while the reaction in the vessel continues.

Figure 3:
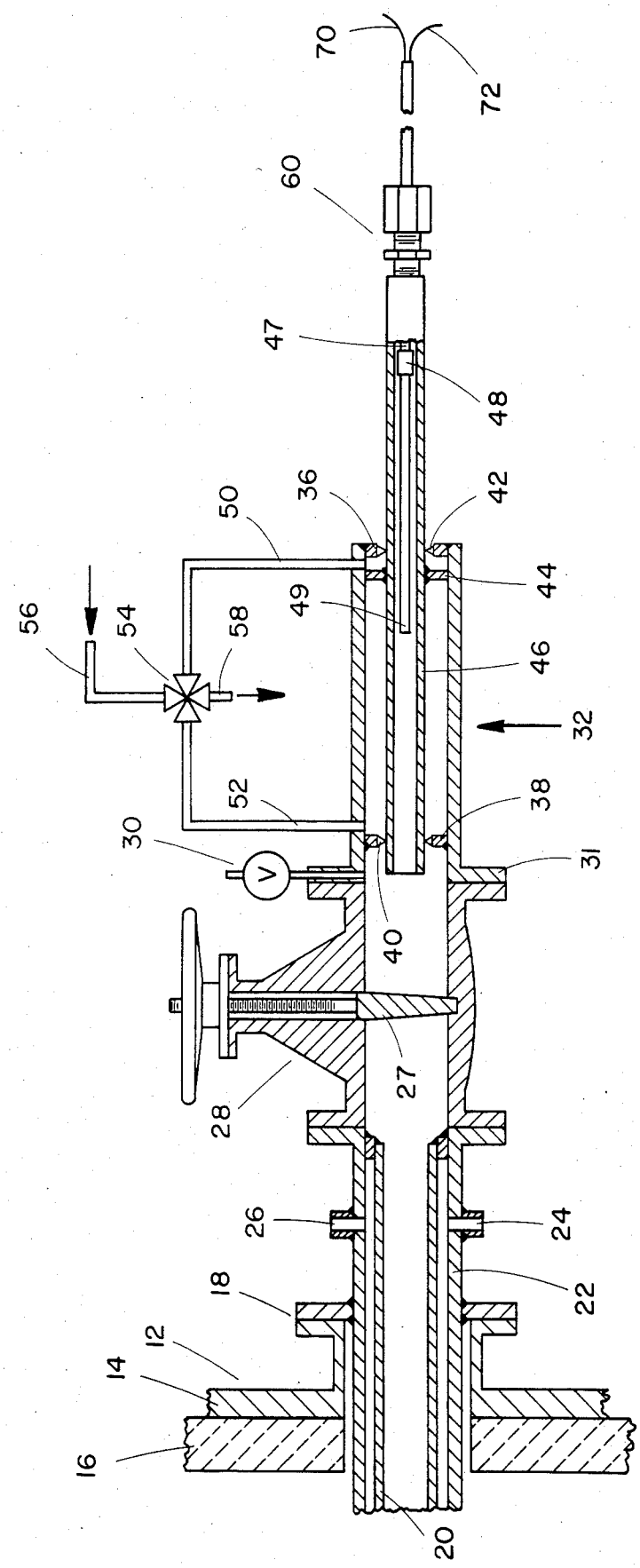
FIG. 3 is a sectional view of the apparatus shown in FIG. 1 with the temperature sensing device in position for removal from the apparatus.

Referring to FIG. 3, first, valve 54 is actuated to feed pressurized gas to tube 52. The actuation of valve 54 will place tube 50 in communication with vent tube 58. Piston 44 is allowed to move back into the full retracted position. Fitting 60 is loosened to allow, with maintenance of the fluid seal provided by fitting 60 still intact, axial rearward movement of tube 47. This rearward movement will locate probe end 49 rearwardly and clear of gate 27. Gate 27 is then lowered to the closed position. Pressure within the vessel is now sealed from that portion of apparatus 10 which is distal of gate 27. Vent 30 is opened to relieve any pressure found distally of gate 27. Fitting 60 is then completely loosened and the mount between tube 47 and hollow piston rod 46 is broken so that tube 47 can be withdrawn and disposed of. A new tube is reinserted in its place and fitting 60 is tightened to provide a fluid seal. Gate 27 is then raised, and tube 47 is then urged forwardly to the desired position within the cylinder 20 and fitting 60 is tightened further to fixedly mount tube 46 to piston rod 45. The apparatus is now in the position of FIG. 2 and ready for continued operation. It should be noted that fitting 60 is designed for static and dynamic sealing, and loosening of its gland nut for positioning of tube 47 is permitted.

We claim:

1. An apparatus for measuring the temperature of a fluid environment within a vessel, said apparatus comprising:
    (a) a chamber means that is sealingly connected to and which opens into said vessel to form a chamber which contains a portion of said fluid environment;
    (b) a temperature sensing means which is movable between a first and a second position, whereby at said first position,
        (i) at least a portion of said temperature sensing means is within said chamber, and
        (ii) said temperature sensing means is out of contact with the remainder of said fluid environment, and whereby at said second position,
        (iii) at least a portion of said temperature sensing means is exterior of said chamber and is in contact with said remainder of said fluid environment so as to obtain said temperature measurement;
    (c) means for preventing substantial convective movement between said portion of said fluid environment and said remainder of said fluid environment when said temperature sensing means is moving between and at said first and second positions; and
    (d) means for maintaining said portion of said fluid environment in said chamber at a cooler temperature than the temperature of said remainder of said fluid environment.

2. The apparatus of claim 1 wherein said apparatus additionally includes a power means to effect said movement of said temperature sensing means.

3. The apparatus of claim 2 wherein said power means is a double acting pneumatic cylinder.

4. The apparatus of claim 1 wherein said chamber means is at least partially defined by a cylindrical wall.

5. The apparatus of claim 1 wherein said means in (d) is a cooling jacket through which a cooling fluid flows, said cooling jacket being around at least a portion of said chamber means.

6. The apparatus of claim 1 wherein said chamber means is at least partially defined by a cylindrical wall and said means in (d) is a cooling jacket around at least a portion of said cylindrical wall.

7. The apparatus of claim 1 wherein said temperature sensing device comprises a thermocouple within an elongated hollow tube, said thermocouple being adjacent the probe end of said elongated hollow tube.

8. The apparatus of claim 7 wherein said power means is a double-acting pneumatic cylinder, the piston rod of said pneumatic cylinder is a hollow tube and wherein said elongated tube is mounted to said hollow tube and has a distal portion within the interior of said hollow tube.

9. The apparatus of claim 8 wherein said mounting of said elongated tube is at the distal end of said hollow tube and wherein the inside surface of said hollow tube and a portion of the outside surface of said elongated tube forms a portion of said chamber.

10. The apparatus of claim 9 wherein said means in (c) additionally accomplishes said mounting of said elongated tube and includes a seal for said prevention of said substantial convective movement.

11. A process for the periodic measuring of the temperature of a fluid environment in a vessel, said process comprising:
(a) providing a chamber that is sealingly connected to said vessel and which opens into said fluid environment, said chamber thereby containing a portion of said fluid environment;
(b) locating at least a portion of a temperature sensing means in said chamber;
(c) maintaining said portion of said fluid environment in said chamber and the remainder of said fluid environment substantially free of convective movement with respect to one another while said temperature sensing means is moving between and is at said points in (d) and (f);
(d) moving from said chamber at least a portion of said temperature sensing means to a point within said remainder of said fluid environment whereby said temperature sensing means is positioned to provide the required output for obtaining said temperature measurement;
(e) obtaining said temperature measurement; and
(f) returning to said chamber that portion of said temperature sensing means moved to said point in (d), subsequent to said obtainment of said temperature measurement.

12. The process of claim 11 wherein said temperature in said chamber is maintained within the range of from about 70° F. (21° C.) to about 200° F. (93° C.).

13. The process of claim 11 wherein said required output is achieved when said temperature sensing means is in substantial thermal equilibrium with said remainder of said fluid environment.

* * * * *